United States Patent [19]

Andres et al.

[11] Patent Number: 4,756,574
[45] Date of Patent: Jul. 12, 1988

[54] INFLATABLE CUSHION APPARATUS FOR MOTOR VEHICLE PASSENGER SEATS

[75] Inventors: Rudolf Andres, Sindelfingen; Hermann Moller, Gartringen, both of Fed. Rep. of Germany

[73] Assignee: Daimler-Benz Aktiengesellschaft, Stuttgart, Fed. Rep. of Germany

[21] Appl. No.: 922,951

[22] Filed: Oct. 24, 1986

[30] Foreign Application Priority Data

Oct. 24, 1985 [DE] Fed. Rep. of Germany ....... 3537847

[51] Int. Cl.⁴ ................................................. A47C 3/00
[52] U.S. Cl. ...................... 297/284; 297/460; 297/DIG. 3
[58] Field of Search ............. 297/284, DIG. 3, 458, 297/459, 460; 5/441, 446, 447, 453, 464

[56] References Cited

U.S. PATENT DOCUMENTS

| 3,110,520 | 11/1963 | Herding ............... | 297/284 X |
| 3,234,623 | 2/1966 | Rector .................. | 5/434 X |
| 4,175,297 | 11/1979 | Robbins et al. ....... | 297/DIG. 3 |
| 4,497,517 | 2/1985 | Gmeiner et al. ...... | 297/284 |
| 4,516,788 | 5/1985 | Umetsu et al. ....... | 297/284 X |
| 4,555,140 | 11/1985 | Nemoto ............... | 297/284 X |
| 4,580,837 | 4/1986 | Bayley ................. | 297/284 X |
| 4,589,695 | 5/1986 | Isono ................... | 297/284 |
| 4,592,588 | 6/1986 | Isono et al. .......... | 297/284 |

FOREIGN PATENT DOCUMENTS

| 267348 | 12/1968 | Austria .................. | 297/284 |
| 1404659 | 11/1968 | Fed. Rep. of Germany ...... | 297/284 |
| 3127303 | 1/1983 | Fed. Rep. of Germany . | |
| 3334864 | 4/1985 | Fed. Rep. of Germany ... | 297/DIG. 3 |

Primary Examiner—Francis K. Zugel
Attorney, Agent, or Firm—Barnes & Thornburg

[57] ABSTRACT

An inflatable cushion is provided to be embedded in the upholstery of a motor vehicle seat. The cushion has one inflatable compartment and is typically placed near an exterior edge of a back support or seat cushion. As the inflatable cushion is inflated, the contours of the back support or seat cushion can be changed. The longitudinal interior edge of the cushion has a wave-like configuration which faces toward the central portion of the back support or seat cushion.

10 Claims, 1 Drawing Sheet

INFLATABLE CUSHION APPARATUS FOR MOTOR VEHICLE PASSENGER SEATS

BACKGROUND AND SUMMARY OF THE INVENTION

This invention relates generally to an inflatable cushion embedded in the upholstery of a motor vehicle seat. The cushion is used to change the contours of the back support and/or the seat cushion. The inflatable cushion is typically placed near the outside edge of the back support or seat cushion in order to facilitate changing these contours.

Such an adjusting device is described in German Unexamined Published patent application DE-OS No. 31 27 303. This device includes two individual cushions embedded within a seat assembly. In order to, in this case, achieve a distinctive wedge shape that causes a good lateral hold for a seat cushion and/or back support. By inflating the cushion located near the edge of the seat more than the cushion that is located near the center, this distinctive wedge shape can be created. However, this air cushion arrangement is relatively expensive and difficult to operate.

Furthermore, it has been contemplated to provide an inflatable cushion on the outside of the seat with a wave-like configuration in order to obtain a gentle slope at the upholstery side facing the passenger. Such an inflatable cushion is described in German Unexamined Published patent application DE-OS 31 25 588. However, this is a cushion structure for the targeted support of the back and is arranged in the center of the back support and consists of several chambers.

It is an objective of the invention to provide an effective lateral support in a simple way and with few expenditures using only one inflatable air cushion, on each side of a seat.

A further objective of this invention is to provide a single inflatable air cushion within the upholstery of a motor vehicle seat to change the contours providing a good lateral support.

A still further objective of this invention is to provide an inflatable air cushion which allows the lateral contours of a vehicle seat to be adjusted to accommodate a wide range of differently shaped people.

These objectives are achieved by providing an inflatable cushion which is embedded in the upholstery of a motor vehicle seat for changing the contours of the back support and/or seat cushion. On the longitudinal side facing the center of the back support or seat cushion the air cushion has a wave-shaped border with intermittent peaks and valleys or troughs.

In the area where the wave crests, these crests being located an equal distance from the opposite edge of the air cushion, there will be a particularly gentle slope with a relatively low wedge height. In the area where the waves are low, there will be a relatively steep slope with a large wedge height. (This can be seen in FIGS. 2 and 3 of the drawings.)

In order to also achieve a large wedge height in an area where the waves are high, the distance of the wave crests to the edge of the cushion is changed. As the volume of the cushion increases, the protruding wave crests 6 are moved closer to the edge of the seat near which the air cushion is embedded. The protruding wave crests 6 being forced to the edge by the forces associated from the wave valleys.

In some embodiments, the wave crests are fixed to the seat element by fastening means. In these embodiments as the volume of air increases within the air cushion, the valley of the waves are moved toward the center of the seat. This provides the wedge shape needed in a slightly different configuration.

Fastening means can also be used to connect the wave crests to each other. This helps to prevent fanning-out of the wave section of the air cushion in an unwanted direction. The fastening also facilitates the correct insertion of the wave section of the air cushion into the recess in the upholstery.

Further objects, features, and advantages of the present invention will become more apparent from the following description when taken with the accompanying drawings which show, for the purposes of illustration only, a preferred embodiment of the present invention.

BRIEF DESCRIPTION OF THE DRAWINGS

FIG. 1A is a side view of the inflatable cushion seat of FIG. 1 illustrating the protruding wave crests extending outwardly from the seat.

DETAILED DESCRIPTION OF THE DRAWINGS

Figure 1:
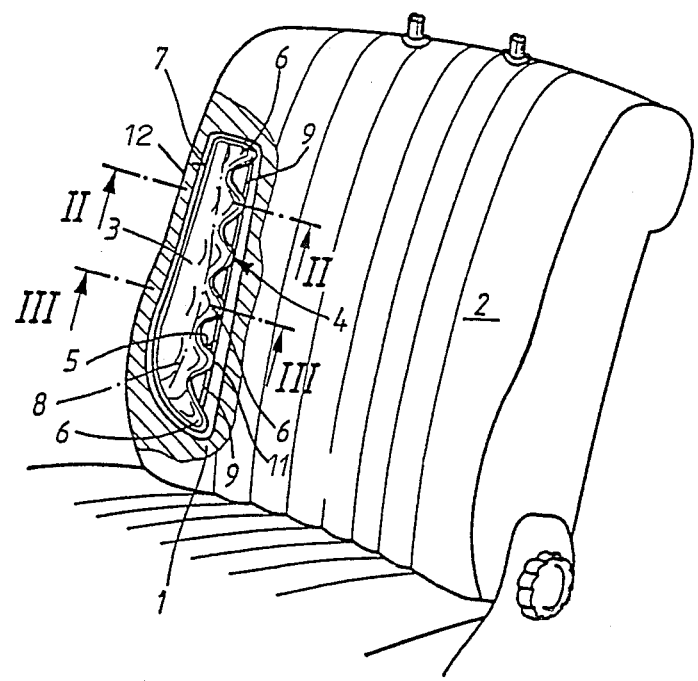
FIG. 1 is a partial schematic front perspective view of a vehicle seat with portions broken away to show an embedded cushion near the side of a back support constructed in accordance with a preferred embodiment of the invention.

For the purposes of illustration, an inflatable seat cushion 3 is shown embedded in the upholstery 1 of a back support 2 near the side of the back support. FIG. 1 shows the motor vehicle seat in simplified form. The air cushion location is not meant to be restricted in any way by the drawing. In preferred embodiments, the air cushions would be provided on both sides of the back support and seat. They can also be provided across the front of the seat to support the thighs and across the top of the backseat to support the neck according to other contemplated preferred embodiments of the invention.

In FIG. 1, the longitudinal side 4 of the cushion 3 that is closest to the center of the back support 2 has a wave-shaped border 5 (furtherest from lateral edge 12). The height of the waves from the opposite interior longitudinal side 7 of the cushion 3 differs. Thus, the distance between the resulting protruding wave crests 6 and the opposite exterior longitudinal side of the cushion 3 varies also.

Figure 2:
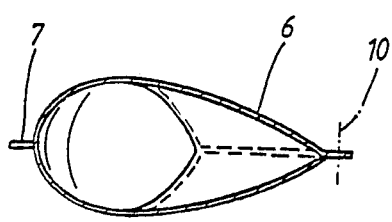
FIG. 2 an enlarged sectional view of only the cushion, taken along Line II—II in FIG. 1, also representing a slight slope of the tear drop shape cushion.
Figure 3:
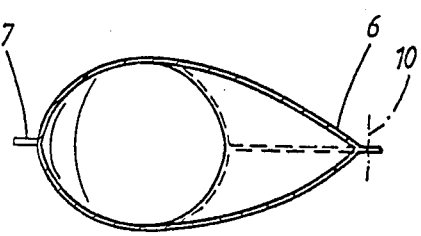
FIG. 3 is an enlarged sectional view similar to FIG. 2, taken along Line III—III in FIG. 1 and showing the inflated cushion enlarged from an increased volume of air, also representing a steep slope of the tear drop shape.

By means of this configuration, the cushion 3, as shown in the sectional views of FIG. 2 and 3 in the area of protruding wave crests 6 is shown. The cushion is tear-drop shaped or flake shaped. In areas where the waves are high, the cushion exhibits a slight slope (such as shown in FIG. 2), while in areas where the waves are relatively low, the slope is much steeper (shown by FIG. 3). (Note that FIGS. 2 and 3 depict different cushion inflation conditions, as well as differnt Sections II—II and III—III from FIG. 1.)

The achievable wedge height and thus the course of the line 8 in FIG. 1 connecting the highest protruding elevations with one another can, in addition to being influenced by differing wave heights and inflating pressures, also be considerably affected by the selection of the distance between the wave crest 11 and the exterior longitudinal side 7. An increase of the distance, because of the resulting volume enlargement shifts the largest protruding wedge height 6 in the direction of the opposite longitudinal side 7. The wedge height at the location is caused by the protruding waves from the two adjacent wave valley locations.

FIG. 1A illustrates the wave-like configuration of the protruding wave crests which extend outwardly from the inflatable cushion in a direction perpendicular to the surface to the seat.

In this way, it is possible to create the most varied configurations so that an optimal lateral hold can be achieved not only with respect to the shown back support but also with respect to the seat cushion of the motor vehicle seat that is not shown. In addition, when a cushion that is developed in this way is embedded in the area of the front edge of the seat cushion, a support of the passenger's thigh area is achieved that is adapted to different requirements.

In the case of a high inflating of the cushion 3, an expanding of the wave section in an undesirable direction is counteracted by connecting wave crests 11 by holding strip 9. This, in turn, holds protruding wave crests 6 together. When the cushion 3 is not inflated, this holding strip 9 helps position the air cushion within upholstery 1.

Cushion 3 can be fastened to the interior of the vehicle seat by fastening the cushion at the location of wave crest 11 to a portion of the seat. This allows a precisely fitting inflatable cushion. The wave crests 6 move differently as the wave crests 11 are restricted from movement. Good lateral support is achieved by changing the volume and wave configuration of the air cushion.

Although the invention has been described in detail with reference to certain preferred embodiments, variations and modifications exist within the scope and spirit of the invention as described and defined in the following claims.

What is claimed is:

1. An inflatable cushion embeddable in an outward side of a seat for changing the contours of said side of said seat wherein said cushion includes a wave-shaped bordering facing a center portion of said seat, and a relatively smooth opposite edge facing an outer portion of said seat, said wave-shaped bordering including wave crests of varying height with respect to said opposite edge.

2. The inflatable cushion according to claim 1, wherein each of said wave crests is an equal distance to said smooth opposite edge directly opposite each of said wave crest.

3. The inflatable cushion according to claim 1 wherein said wave crests are connected to one another by a holding strip.

4. The inflatable cushion of claim 1 further including air control means for increasing and decreasing the volume of air within said cushion.

5. The inflatable cushion of claim 1 further including a seat and wherein said cushion is embedded within said seat.

6. The seat and cushion of claim 5 wherein said wave crests are equally spaced from a side of said seat.

7. The seat and cushion of claim 5 wherein said wave crests vary in distance from a side of said seat.

8. The seat and cushion of claim 5 wherein said wave crests are attached at a plurality of locations within said seat.

9. The seat and cushion of claim 5 wherein said wave crests are connected to one another by a holding strip and said holding strip is attached to a plurality of location within said seat.

10. The seat and cushion on claim 5 wherein said cushion when inflated with air produces a wave-like configuration of said seat as said wave crests protrude outwardly from said seat in a direction substantially perpendicular to air surface of said seat.

* * * * *